United States Patent
Kawasaki

(10) Patent No.: US 10,852,522 B2
(45) Date of Patent: Dec. 1, 2020

(54) MICROSCOPE ILLUMINATION DEVICE AND MICROSCOPE

(71) Applicant: OLYMPUS CORPORATION, Hachioji-shi (JP)

(72) Inventor: Kenji Kawasaki, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 299 days.

(21) Appl. No.: 15/809,932

(22) Filed: Nov. 10, 2017

(65) Prior Publication Data

US 2018/0149850 A1   May 31, 2018

(30) Foreign Application Priority Data

Nov. 25, 2016 (JP) ................................. 2016-229354

(51) Int. Cl.
*G02B 21/06* (2006.01)
*G02B 21/16* (2006.01)

(52) U.S. Cl.
CPC ............. *G02B 21/06* (2013.01); *G02B 21/16* (2013.01)

(58) Field of Classification Search
CPC ........ G02B 21/06; G02B 21/00; G02B 6/425; H01L 24/167; H01L 25/048
See application file for complete search history.

(56) References Cited

U.S. PATENT DOCUMENTS

| 4,852,985 A | 8/1989 | Fujihara et al. |
| 2005/0047172 A1* | 3/2005 | Sander .................. G02B 21/06 362/554 |
| 2013/0155040 A1* | 6/2013 | Kobayashi ........... G09G 3/3406 345/204 |
| 2014/0233095 A1 | 8/2014 | Lee |

FOREIGN PATENT DOCUMENTS

| JP | 63098619 A | 4/1988 |
| JP | 11287958 A | 10/1999 |
| JP | 2005148296 A | 6/2005 |
| JP | 2007116112 A | 5/2007 |
| JP | 2007333800 A | 12/2007 |

OTHER PUBLICATIONS

Japanese Office Action dated Jun. 2, 2020 (and English translation thereof) issued in Japanese Application No. 2016-229354.

* cited by examiner

*Primary Examiner* — Darryl J Collins
*Assistant Examiner* — Journey F Sumlar
(74) *Attorney, Agent, or Firm* — Holtz, Holtz & Volek PC

(57) ABSTRACT

A microscope illumination device includes a white LED light source, and an illumination optical system that includes an aperture stop on a plane on which light from the white LED light source is condensed. The white LED light source includes a board, a plurality of LED chips that are arranged on the board and that each emit excitation light, and a phosphor layer that is provided so as to cover the plurality of LED chips and that includes at least three types of (Continued)

phosphors. The plurality of LED chips are arranged so as to be projected into an aperture of the aperture stop.

14 Claims, 20 Drawing Sheets

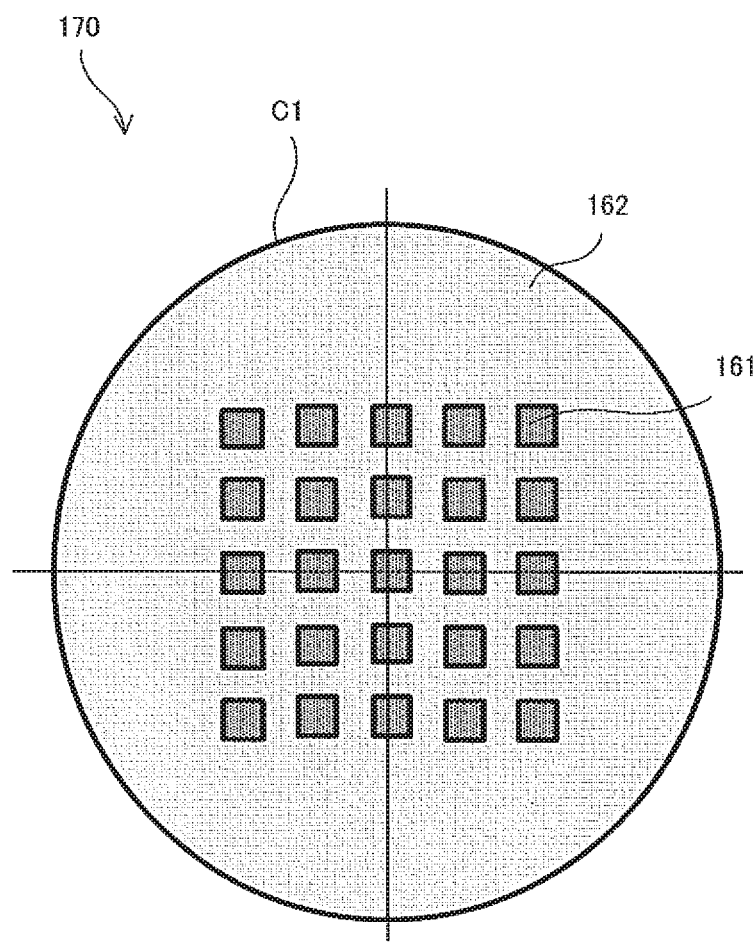
F I G. 1 1

US 10,852,522 B2

MICROSCOPE ILLUMINATION DEVICE AND MICROSCOPE

CROSS REFERENCE TO RELATED APPLICATIONS

This application is based upon and claims the benefit of priority from the prior Japanese Patent Application No. 2016-229354, filed on Nov. 25, 2016, the entire contents of which are incorporated herein by this reference.

BACKGROUND OF THE INVENTION

Field of the Invention

The disclosure of the present invention relates to a microscope illumination device including a white light-emitting diode (LED) light source, and a microscope including the white LED light source.

Description of the Related Art

In recent years, in the field of microscopes, there have been an increasing number of cases in which an LED light source that has a long life and a small power consumption is used as a light source. A microscope illumination device including the LED light source is described, for example, in Japanese Laid-Open Patent Publication No. 63-098619, Japanese Laid-Open Patent Publication No. 11-287958, Japanese Laid-Open Patent Publication No. 2005-148296, and Japanese Laid-Open Patent Publication No. 2007-333800.

SUMMARY OF THE INVENTION

A microscope illumination device in one aspect of the present invention includes: a white LED light source that includes a board, a plurality of LED chips that are arranged on the board and that each emit excitation light, and a phosphor layer that is provided so as to cover the plurality of LED chips and that includes at least three types of phosphors; and an illumination optical system that includes an aperture stop on a plane on which light from the white LED light source is condensed, and the plurality of LED chips are arranged so as to be projected into an aperture of the aperture stop.

A microscope in another aspect of the present invention includes the microscope illumination device in the one aspect of the present invention.

BRIEF DESCRIPTION OF THE DRAWINGS

The present invention will be more apparent from the following detailed description when the accompanying drawings are referenced.

FIG. 11 illustrates an example of the arrangement of LED chips 161 in a white LED light source 170 in example 2.

DESCRIPTION OF THE EMBODIMENTS

The schemes of existing white LED light sources are roughly divided into a scheme using LED chips of three colors, red, green, and blue and a scheme using an LED chip and a phosphor. Both light beams emitted from white LED light sources according to the schemes above have optical spectrum characteristics that are significantly different from those of light emitted from a halogen light source that is widely used in a microscope illumination device. Therefore, the existing white LED light sources have color rendering that is different from that of the halogen light source. Accordingly, it is very difficult to use the existing white LED light sources for an application that requests a high color reproducibility, such as pathological diagnosis, from among applications of a microscope.

In addition, the existing white LED light sources have an advantage wherein their life is long and their power consumption is small in comparison with the halogen light source, but illumination using an existing white LED light source has a problem wherein luminance is likely to be insufficient in comparison with illumination using the halogen light source.

Figure 1:
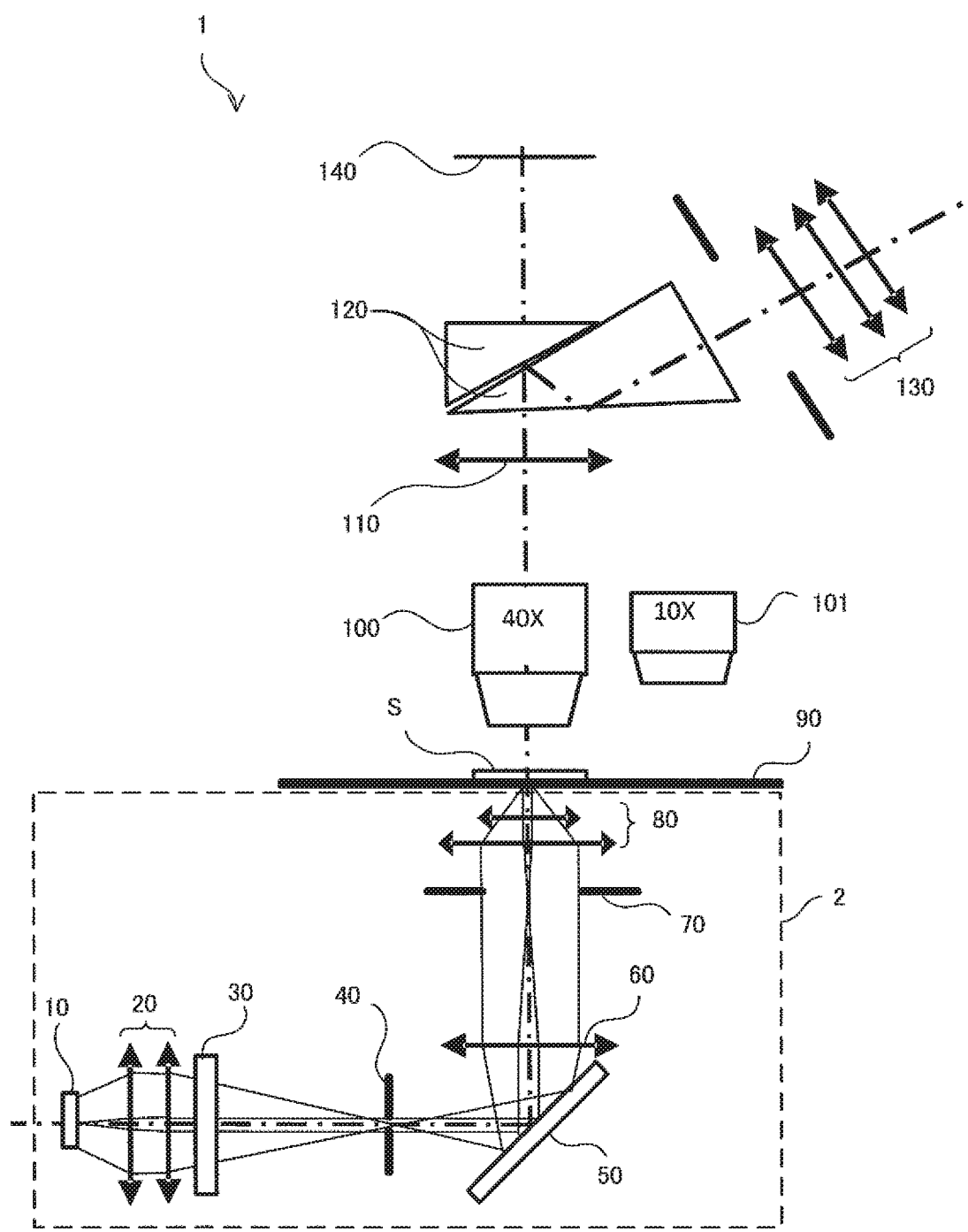
FIG. 1 illustrates an example of the configuration of a microscope 1.
Figure 2:
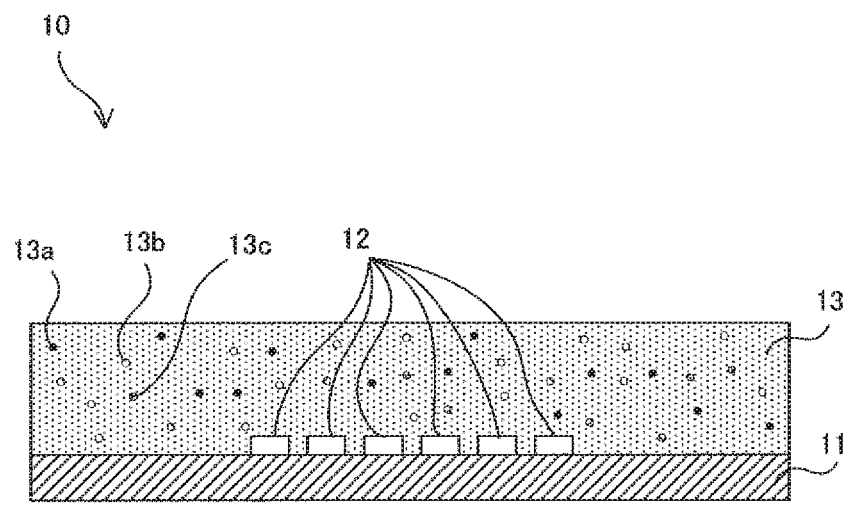
FIG. 2 schematically illustrates a cross section of a white LED light source 10.
Figure 3:
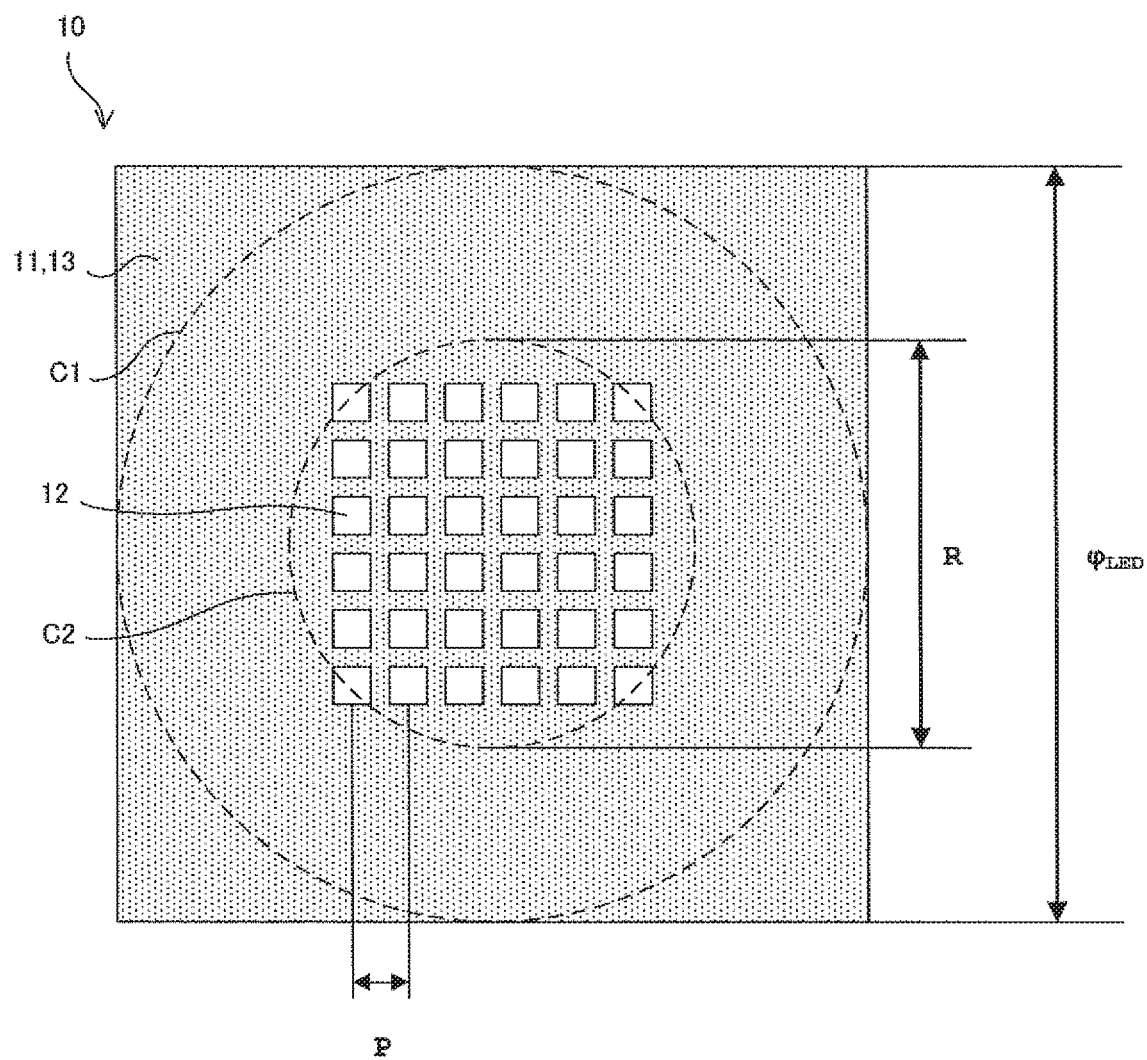
FIG. 3 illustrates an example of the arrangement of LED chips 12 in the white LED light source 10.

FIG. 1 illustrates an example of the configuration of a microscope 1. FIG. 2 schematically illustrates a cross section of a white LED light source 10. FIG. 3 illustrates an example of the arrangement of LED chips 12 in the white LED light source 10.

The microscope 1 illustrated in FIG. 1 is an upright microscope, and the microscope 1 includes a microscope illumination device 2 including a white LED light source 10. A user of the microscope 1 can visually observe a specimen S arranged on a stage 90 via an eyepiece 130, or can perform imaging by using an image sensor 140.

The microscope illumination device 2 is an illumination device that illuminates the specimen S by using Koehler illumination. The microscope illumination device 2 includes the white LED light source 10 and an illumination optical system that irradiates the specimen S with light from the white LED light source 10.

The white LED light source 10 is a white LED light source of a so-called chip-on-board (COB) type. The white LED light source 10 includes a board 11, a plurality of LED chips 12 that are arranged on the board 11 and that each emit excitation light, and a phosphor layer 13 that is provided so as to cover the plurality of LED chips 12, as illustrated in FIG. 2. The phosphor layer 13 includes three types of phosphors (a phosphor 13a, a phosphor 13b, and a phosphor 13c). The description below is given using an example in which the phosphor layer 13 includes three types of phosphors, but the phosphor layer 13 does not always need to include three types of phosphors. The phosphor layer 13 may at minimum include three types of phosphors.

The plurality of LED chips 12 are arranged so as to be projected into an aperture of an aperture stop 70 included in the illumination optical system when the aperture stop 70 is in an open state. Specifically, as illustrated in FIG. 3, for example, the plurality of LED chips 12 are arranged in 6 rows and 6 columns on the board 11. The open state is a state in which the aperture stop 70 is fully open, and is a state in which the diameter of an aperture (hereinafter referred to as an aperture diameter) of the aperture stop 70 is the maximum.

Each of the plurality of LED chips 12 is an LED chip that emits excitation light in a near-ultraviolet wavelength region. Each of the three types of phosphors included in the phosphor layer 13 is a phosphor that generates fluorescence in a visible wavelength region. These phosphors are excited by the excitation light in the near-ultraviolet wavelength region that has been emitted from the LED chips 12 or by visible light that has been generated by another phosphor excited by the excitation light in the near-ultraviolet wavelength region. The three types of phosphors generate fluorescent beams in visible wavelength regions different from each other. In particular, it is preferable that the three types of phosphors generate fluorescent beams of wavelengths that correspond to RGB.

The white LED light source 10 emits white light in which three types of fluorescence and excitation light are mixed. Due to color mixture, the white light emitted by the white LED light source 10 has an optical spectrum distribution that is similar to an optical spectrum distribution at the time when a daylight color (white) filter is combined with light from a halogen light source, as illustrated in FIG. 4.

Figure 4:
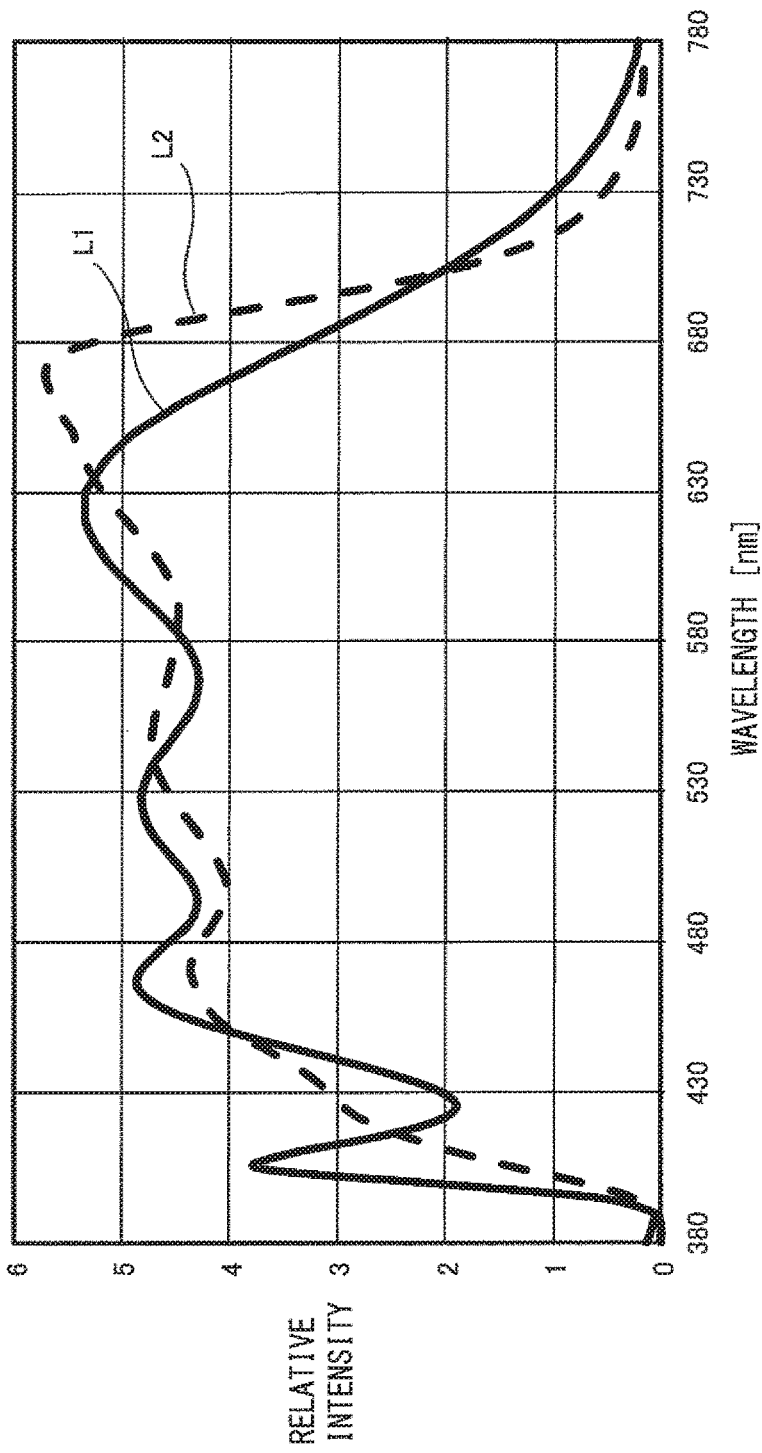
FIG. 4 illustrates an optical spectrum at the time when a filter that performs conversion to a daylight color (white) is combined with light emitted from a halogen light source, and optical spectrum characteristics of light emitted from the white LED light source 10.

FIG. 4 illustrates optical spectrum characteristics L1 of light emitted from the white LED light source 10, and optical spectrum characteristics L2 at the time when a daylight color (white) filter is combined with light emitted from a halogen light source. The optical spectrum characteristics L1 include four peak wavelengths (near 400 nm, near 460 nm, near 530 nm, and near 630 nm) that respectively indicate the wavelength of excitation light, the wavelength of fluorescence that corresponds to blue (B), the wavelength of fluorescence that corresponds to green (G), and the wavelength of fluorescence that corresponds to red (R). As illustrated in FIG. 4, the optical spectrum characteristics L1 of the light emitted from the white LED light source 10 are similar to the optical spectrum characteristics L2 at the time when the daylight color (white) filter is combined with the light from the halogen light source.

Figure 5:
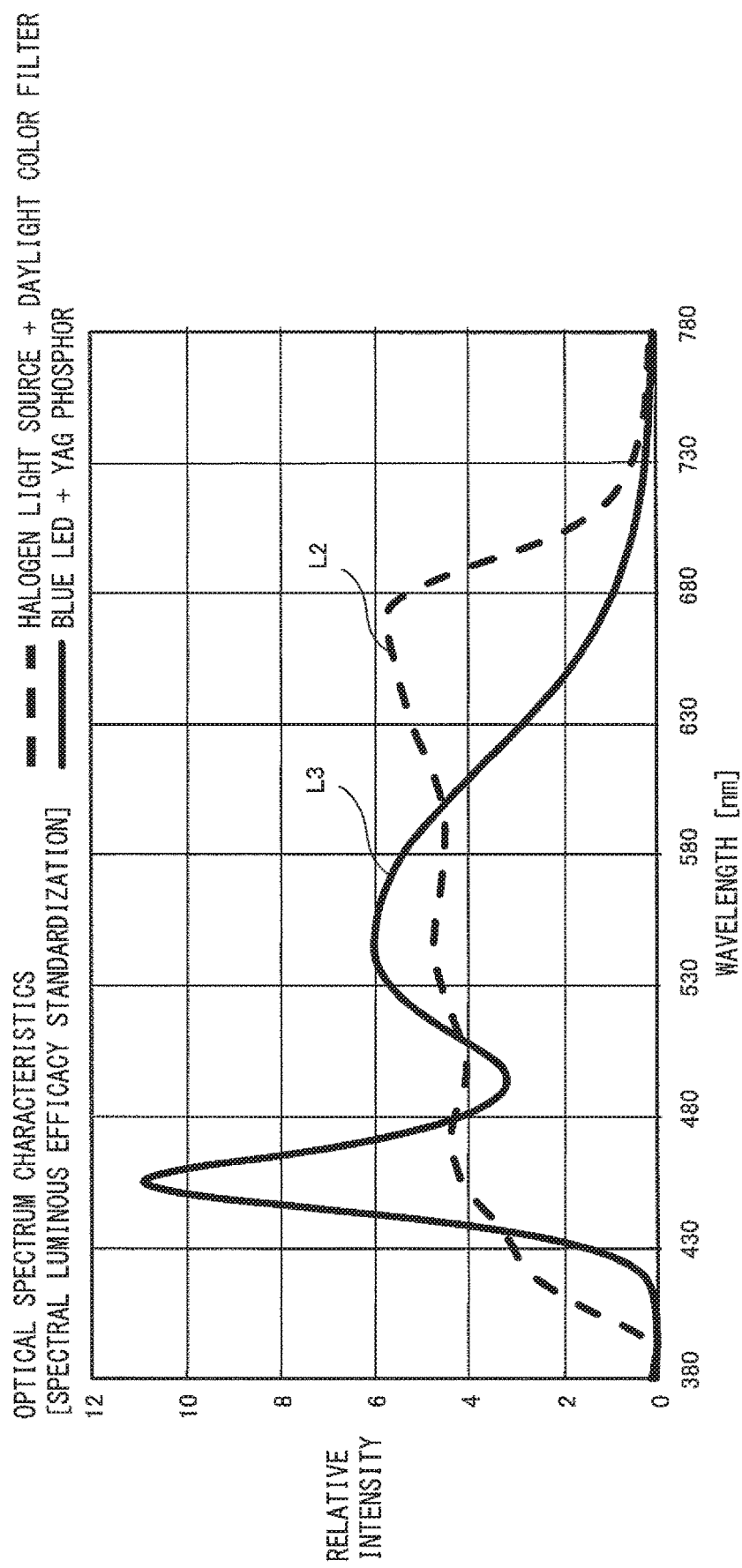
FIG. 5 illustrates an optical spectrum at the time when a filter that performs conversion to a daylight color (white) is combined with light emitted from a halogen light source, and optical spectrum characteristics of light emitted from an existing white LED light source.

FIG. 5 illustrates optical spectrum characteristics L3 of light emitted from an existing white LED light source, and the optical spectrum characteristics L2 at the time when the daylight color (white) filter is combined with the light from the halogen light source. The optical spectrum characteristics L3 are optical spectrum characteristics of light emitted from a white LED light source including a phosphor layer including YAG phosphors and a blue LED chip. The light emitted from the existing white LED light source has a feature whereby blue is strong and red is weak in comparison with the light emitted from the halogen light source, as illustrated in FIG. 5, and therefore color rendering is significantly different.

By comparing FIG. 4 with FIG. 5, it can be confirmed that the optical spectrum characteristics L1 of the light emitted from the white LED light source 10 and the optical spectrum characteristics L2 of light emitted from a combination of the halogen light source and the daylight color (white) filter have a high degree of similarity. Hereinafter, "optical spectrum characteristics of light emitted from a light source (or a combination of a light source and a filter)" are simply referred to as "optical spectrum characteristics of a light source".

The illumination optical system of the microscope illumination device 2 includes a collector lens 20, a diffusion plate 30, a field stop 40, a mirror 50, a relay lens 60, an aperture stop 70, and a condenser lens 80. Each of the field stop 40 and the aperture stop 70 is a variable stop that has a variable aperture diameter.

The collector lens 20 collects light emitted from the white LED light source 10, and guides the light to the diffusion plate 30. The diffusion plate 30 is not particularly limited, but is, for example, a diffusion plate of a frosted type. As the diffusion plate 30, an arbitrary type of diffusion plate may be employed that can suppress illumination unevenness due to light distribution characteristics of the white LED light source 10.

The field stop 40 is a stop used to adjust an illumination range (an illumination field), and the field stop 40 is arranged in a position that is optically conjugate to a specimen surface (namely, a rear-side focal plane of the condenser lens 80). By changing the aperture diameter of the field stop 40, the illumination range (the illumination field) can be changed. The rear-side focal plane of the condenser lens 80 is a focal plane that is located closer to the specimen S than the condenser lens 80 from among focal planes of the condenser lens 80.

Light that has passed through the field stop 40 is reflected by the mirror 50, and enters the relay lens 60. The relay lens 60 condenses light that has been collimated by the collector lens 20 and has passed through the field stop 40 on a plane on which the aperture stop 70 is arranged, and the relay lens 60 forms an image (a light source image) of the white LED light source 10. The condenser lens 80 irradiates the specimen S with light from the light source image.

The aperture stop 70 is a stop used to adjust the numerical aperture of illumination light that is applied to the specimen S, and the aperture stop 70 is arranged on a front-side focal plane of the condenser lens 80. The front-side focal plane of the condenser lens 80 is located in a position optically conjugate to the white LED light source 10 (hereinafter, a plane on which the aperture stop is located is referred to as a first plane). By changing the aperture diameter of the aperture stop 70, the numerical aperture of the illumination light that is applied to the specimen S can be changed. The front-side focal plane of the condenser lens 80 is a focal plane that is located closer to the white LED light source 10 than the condenser lens 80 from among focal planes of the condenser lens 80.

The microscope 1 includes objectives (an objective 100 and an objective 101), a tube lens 110, a prism 120, an eyepiece 130, and an image sensor 140 in addition to the microscope illumination device 2.

The objective 100 and the objective 101 are infinity-corrected objectives that are used by being switched by a not-illustrated revolver, and each of the objective 100 and the objective 101 collects light from the specimen S and outputs an infinity-corrected light flux. The tube lens 110 condenses the infinity-corrected light flux from the objective, and forms an image of the specimen S.

The prism 120 guides light from the tube lens 110 to at least one of an observation optical path to the eyepiece 130 and a detection optical path to the image sensor 140. The prism 120 may be, for example, a splitter that splits incident light at a prescribed ratio of an amount of light. The prism 120 may configure an optical-path switching mechanism that switches an optical path through which incident light proceeds by inserting or removing the entirety or a portion of the prism 120 into/from an optical axis of the objective.

The eyepiece 130 projects the image of the specimen S that has been formed by the tube lens 110 onto the pupil of a user of the microscope 1. The user can visually observe the specimen S by looking through the eyepiece 130.

The image sensor 140 is arranged on an image plane on which the image of the specimen S is formed by the tube lens 110. The image sensor 140 is, for example, a charge coupled device (CCD) image sensor or a complementary metal oxide semiconductor (CMOS) image sensor that is included in an imaging device. Image data of the specimen S is generated by a not-illustrated image processing device in accordance with a signal output from the image sensor 140.

In the microscope illumination device 2 and the microscope 1 that are configured above, white light emitted from the white LED light source 10 has an optical spectrum distribution that is similar to an optical spectrum distribution at the time when a daylight color (white) filter is combined with light from a halogen light source. Therefore, color rendering that is equivalent to that of a spectrum at the time when the daylight color (white) filter is combined with the light from the halogen light source can be achieved. In addition, the white LED light source 10 is a COB LED light source that has a satisfactory luminous efficacy, and the plurality of LED chips 12 included in the white LED light source 10 are projected into the aperture of the aperture stop 70. Therefore, the specimen S can be brightly illuminated. In addition, the specimen S is illuminated by using Koehler illumination, and therefore a high uniformity of illumination can be achieved. Further, the diffusion plate 30 is provided, and therefore illumination unevenness due to light distribution characteristics of the white LED light source 10 is suppressed. Accordingly, in the microscope illumination device 2 and the microscope 1, a high illumination performance and color rendering that is equivalent to that of the halogen light source can be achieved by using the white LED light source 10.

Conditions that are preferably satisfied by the microscope illumination device 2 and the microscope 1 are described next. It is preferable that the microscope illumination device 2 satisfy conditional expressions (1) and (2) described below.

$$0.7 \leq \varphi_{LED} \times MG/\varphi_{AS} \leq 1.5 \quad (1)$$

$$0.3 \leq R/\varphi_{LED} \quad (2)$$

$\varphi_{LED}$ is the diameter of circle C1 (see FIG. 3) inscribed in the phosphor layer 13 when the white LED light source 10 is viewed from a direction of an optical axis of the illumination optical system. MG is the magnification of image $I_{10}$ of the white LED light source 10 that is projected onto the first plane on which the aperture stop 70 is located (hereinafter also simply referred to as a projection magnification). $\varphi_{AS}$ is the aperture diameter of the aperture stop 70 in an open state (namely, a fully open state). R is the diameter of a minimum circle C2 (see FIG. 3) that includes the plurality of LED chips 12. Here, the "plurality of LED chips 12" mean all of the LED chips 12 that are projected into the aperture of the aperture stop 70 when the aperture stop 70 is in the open state, and to "include the plurality of LED chips 12" means to include all of the center positions of the respective LED chips 12 projected into the aperture.

Figure 6:
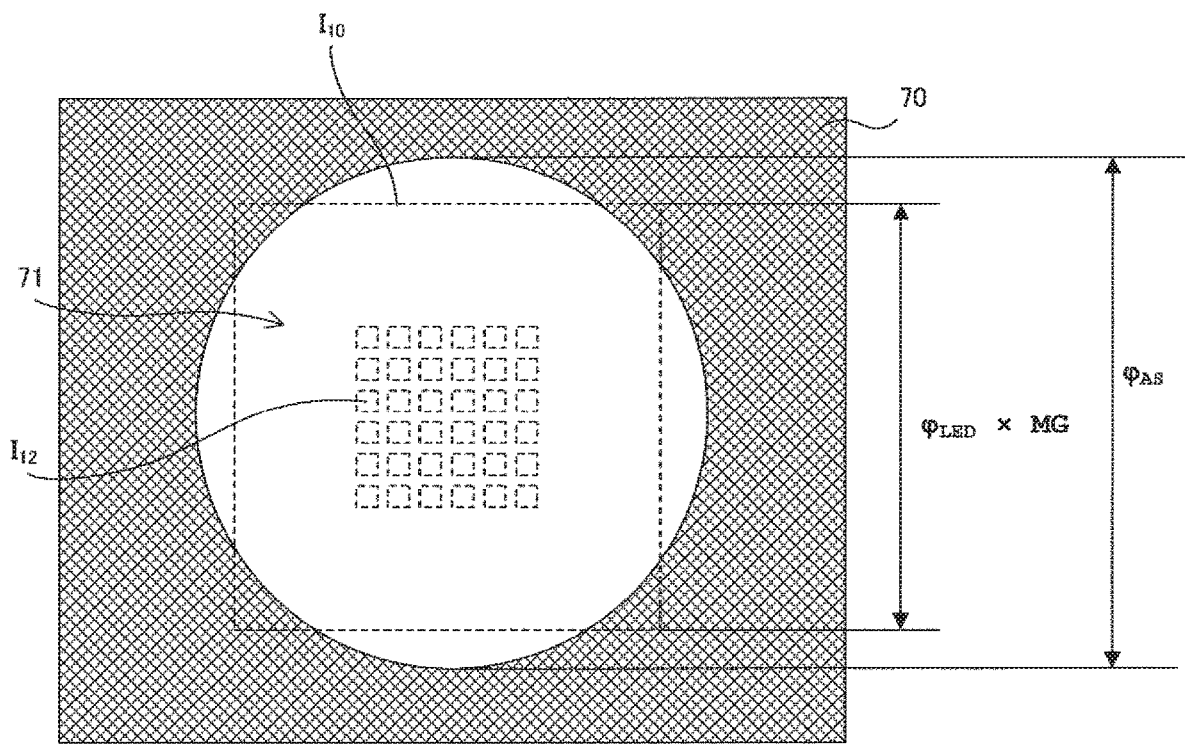
FIG. 6 illustrates an example of light source image $I_{10}$ projected onto an aperture stop 70 in an open state.
Figure 7:
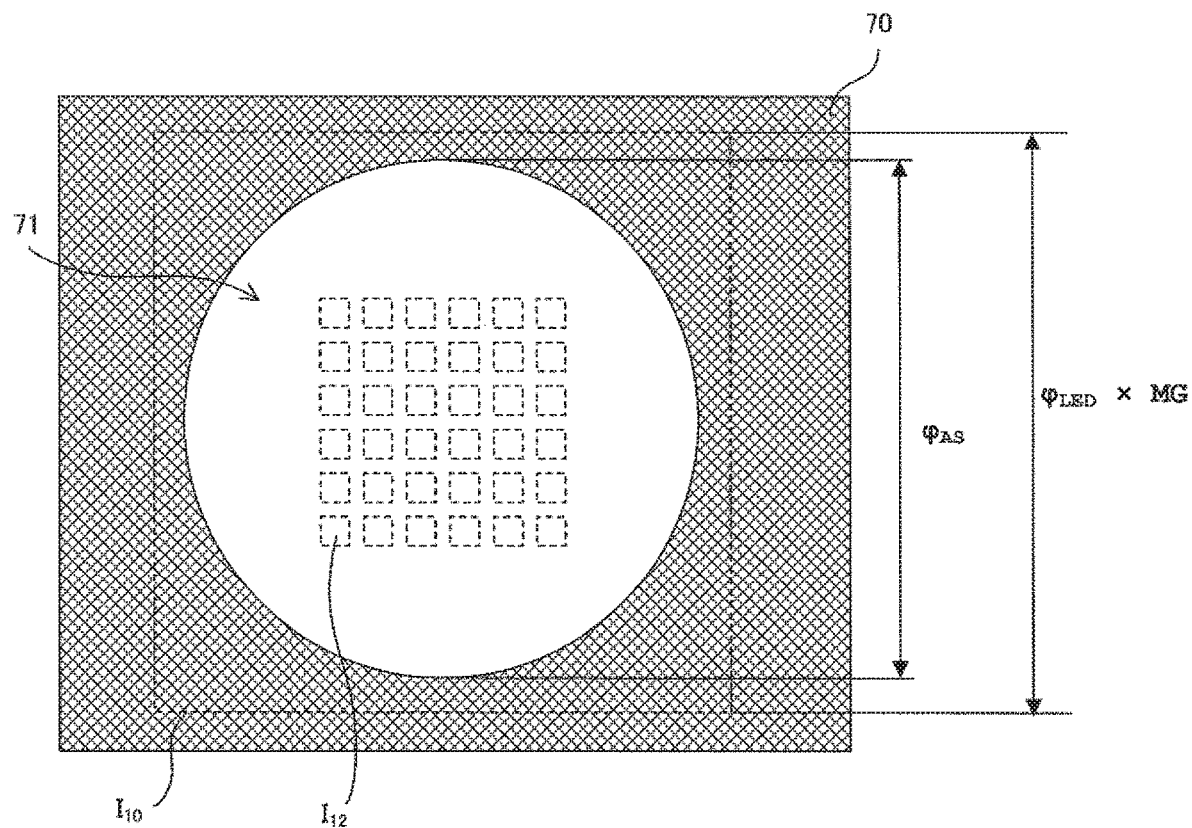
FIG. 7 illustrates another example of light source image $I_{10}$ projected onto the aperture stop 70 in the open state.

Conditional expression (1) indicates a relationship between image $I_{10}$ of the white LED light source 10 formed on the first plane and the maximum diameter of an aperture 71 of the aperture stop 70. FIG. 6 and FIG. 7 illustrate respective examples of light source image $I_{10}$ projected onto the aperture stop 70 in the open state. FIG. 6 illustrates an example in which $\varphi_{LED} \times MG/\varphi_{AS}$ is smaller than 1, and FIG. 7 illustrates an example in which $\varphi_{LED} \times MG/\varphi_{AS}$ exceeds 1. Image $I_{12}$ illustrated in FIG. 6 and FIG. 7 is an image of the LED chip 12 projected onto the first plane.

When $\varphi_{LED} \times MG/\varphi_{AS}$ exceeds an upper limit value, image $I_{10}$ of the white LED light source 10 becomes excessively large relative to the aperture 71. Therefore, the illumination efficiency deteriorates, and an amount of light illuminating the specimen S is reduced. When $\varphi_{LED} \times MG/\varphi_{AS}$ becomes smaller than a lower limit value, image $I_{10}$ of the white LED light source 10 becomes excessively small relative to the aperture 71. Therefore, it is difficult to sufficiently exhibit the performance of the condenser lens 80, and the condenser lens 80 is limited to illumination of a numerical aperture that is lower than the maximum numerical aperture that the condenser lens 80 can realize.

By satisfying conditional expression (1), a light-emitting surface of the white LED light source 10 is projected onto the first plane at an appropriate ratio to the aperture 71 of the aperture stop 70, and consequently, the performance of the condenser lens 80 is exhibited sufficiently. Therefore, illumination light having a high numerical aperture can be efficiently applied from the condenser lens 80 to the specimen S, and the specimen S can be brightly illuminated.

Conditional expression (2) indicates a ratio of a region in which the plurality of chips 12 occupying the white LED light source 10 are arranged. In the white LED light source 10, light is output from the entire surface of the phosphor layer 13, but in a surface portion that corresponds to a region in which the LED chips 12 exist, a spectral component of excitation light is strong, and luminance is high. In contrast, a surface portion that corresponds to a region in which the LED chips 12 do not exist, the spectral component of the excitation light is weak, and the luminance is low. Therefore, the uniformity of the luminance and the spectral component on the light-emitting surface (namely, the entire surface of the phosphor layer 13) depends on the arrangement of the LED chips 12.

When $R/\varphi_{LED}$ becomes smaller than a lower limit value, the plurality of LED chips 12 are excessively concentrated in a partial region, for example, near the center of the white LED light source 10. Therefore, a non-uniform luminance distribution is formed in which a narrow range near the center of the light-emitting surface has a high luminance and the periphery has a low luminance. The luminance distribution above reduces an actual size of a light source image. Therefore, effects similar to those in a case in which a projection magnification is reduced are exhibited, and even when a large white LED light source 10 is used, a large light-emitting surface of the large white LED light source 10 can fail to be sufficiently utilized. Stated another way, the condenser lens 80 is limited to illumination of a numerical aperture that is lower than the maximum numerical aperture that the condenser lens 80 can realize.

By satisfying conditional expression (2), a luminance distribution and a spectral component distribution having a uniformity suitable for illumination can be achieved on the light-emitting surface. In particular, by simultaneously satisfying conditional expression (1) and conditional expression (2), the specimen S can be brightly illuminated by using a luminance distribution having a high uniformity on the light-emitting surface of the white LED light source 10.

Figure 8:
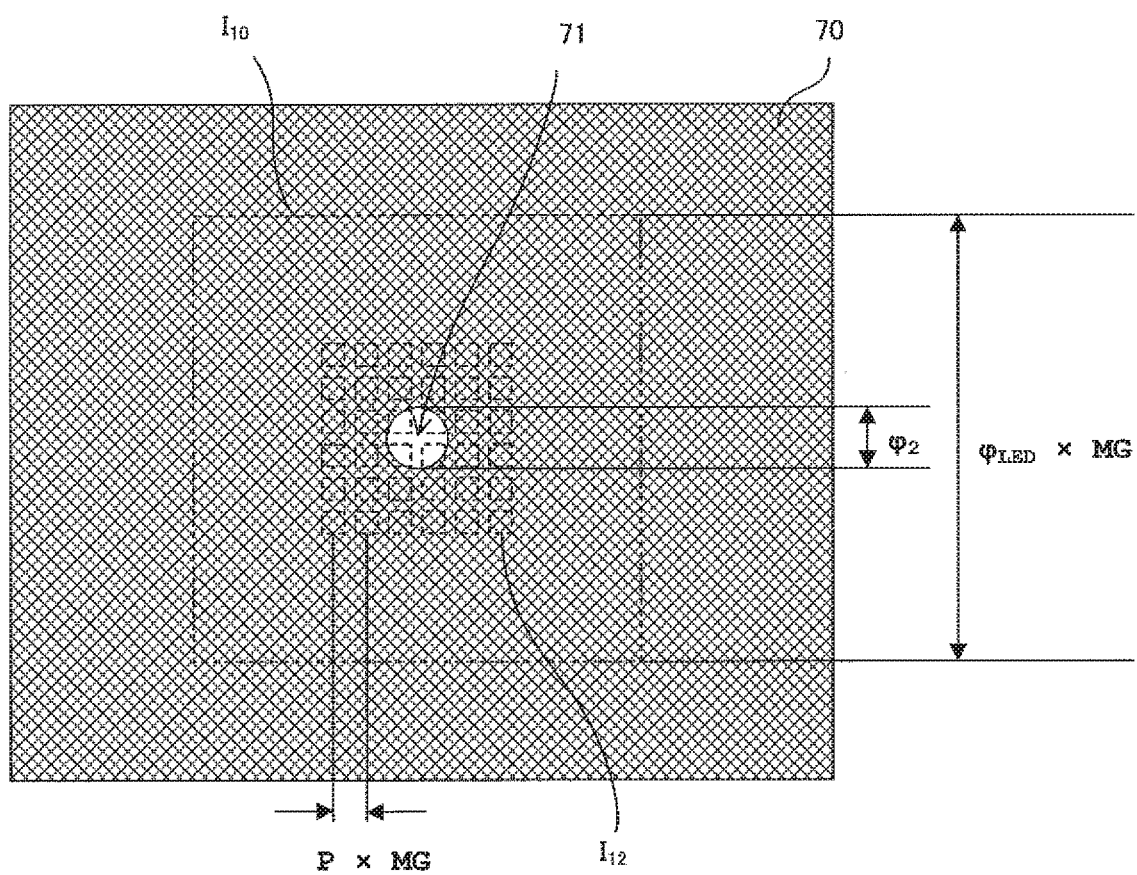
FIG. 8 illustrates an example of light source image $I_{10}$ projected onto the aperture stop 70 in a state in which the aperture size of the aperture stop 70 is minimized.

It is preferable that the microscope illumination device 2 further satisfy conditional expression (3) described below and that the center of at least one LED chip of the plurality of LED chips 12 be projected into the aperture 71 of the aperture stop 70 in a state in which the size of the aperture is minimized, as illustrated in FIG. 8. FIG. 8 illustrates an example of light source image $I_{10}$ projected onto the aperture stop 70 in a state in which the aperture size of the aperture stop 70 is minimized.

$$0.25 \leq \varphi_2/(P \times MG) \leq 2 \quad (3)$$

$\varphi_2$ is the aperture diameter of the aperture stop 70 in a state in which the aperture size of the aperture stop 70 is minimized. P is a minimum space between the centers of the LED chips 12.

Conditional expression (3) indicates a relationship between a space between the centers of images $I_{12}$ of a plurality of LED chips formed on the first plane and a minimum diameter of the aperture 71 of the aperture stop 70. By satisfying conditional expression (3), an amount of illumination light in a state in which the aperture size of the aperture stop 70 is minimized is prevented from being excessively reduced, and the illumination performance of the microscope illumination device 2 can be assured.

When $\varphi_2/(P \times MG)$ exceeds an upper limit value, the projection magnification is excessively reduced such that image $I_{10}$ of the white LED light source 10 becomes excessively small. Therefore, even when the aperture stop 70 is in the open state, the condenser lens 80 is limited to illumination of a numerical aperture that is lower than the maximum numerical aperture that the condenser lens 80 can realize. When the projection magnification is not excessively low but $\varphi_2/(P \times MG)$ exceeds the upper limit value, the minimum space between the centers of the plurality of LED chips 12 is excessively reduced. In this case, the densely arranged LED chips 12 may hinder the heat dissipation of the white LED light source 10, and therefore the luminous efficacy of the white LED light source 10 is reduced, and this results in a decrease in the illumination efficiency of the microscope illumination device 2.

When $\varphi_2/(P \times MG)$ becomes smaller than a lower limit value, the minimum space between the centers of the plurality of LED chips 12 increases excessively. As a result, luminance and light distribution characteristics become uneven between surface portions on the LED chips 12 and surface portions between the LED chips 12. Therefore, the uniformity of luminance and light distribution characteristics on the light-emitting surface is impaired, and the uniformity of illumination in the open state is reduced. Further, when a space between the plurality of LED chips 12 is large, the number of LED chips 12 projected into the aperture 71 is reduced in a state in which the aperture size of the aperture stop 70 is minimized, and this results in an insufficient amount of illumination light.

By satisfying conditional expressions (1) to (3) described above, the microscope illumination device 2 and the microscope 1 can achieve a high illumination performance and color rendering that is equivalent to that of the halogen light source by using the white LED light source 10 regardless of the state of the aperture stop 70.

It is preferable that the microscope illumination device 2 further satisfy conditional expressions (4) to (6) described below.

$$0.25 \leq (S1 \times MG)/(\pi \times (\varphi_2/2)^2) \leq 1 \quad (4)$$

$$0.1 \leq S0/(\pi \times (R/2)^2) \quad (5)$$

$$0.03 \leq (S0 \times MG)/(\pi \times (\varphi_{AS}/2)^2) \leq 0.15 \quad (6)$$

S1 is the area of a single LED chip of the plurality of LED chips 12. S0 is the sum of the areas of the plurality of LED chips 12.

Conditional expression (4) indicates a relationship between the area of image $I_{12}$ of the LED chip 12 projected onto the first plane and the area of an aperture in a state in which the aperture size of the aperture stop 70 is minimized. By satisfying conditional expression (4), bright illumination with a high illumination efficiency can be achieved in a state in which the aperture size of the aperture stop 70 is minimized.

When $(S1 \times MG)/(\pi \times (\varphi_2/2)^2)$ exceeds an upper limit value, the magnification (namely, the projection magnification) of image $I_{12}$ excessively increases such that the size of image $I_{12}$ excessively increases relative to the minimum diameter of the aperture 71 of the aperture stop 70. Therefore, illumination efficiency in a state in which the aperture size of the aperture stop 70 is minimized is reduced. When $(S1 \times MG)/(\pi \times (\varphi_2/2)^2)$ becomes smaller than a lower limit value, the magnification of image $I_{12}$ is excessively reduced such that the size of image $I_{12}$ is excessively reduced relative to the minimum diameter of the aperture 71 of the aperture stop 70. Therefore, luminance unevenness is generated significantly within the aperture diameter of the aperture stop 70, and an angular component of light applied to a specimen at the time when the aperture size of the aperture stop 70 is reduced is not distributed isotropically with respect to an optical axis. Thus, the appearance of the specimen changes.

Conditional expression (5) indicates a relationship between the sum of the areas of the plurality of LED chips 12 and the area of a minimum circle including the plurality of LED chips 12. By satisfying conditional expression (5), the uniformity of a luminance distribution in the light-emitting surface is improved such that a numerical aperture in illumination can be further homogenized. Therefore, the specimen S can be illuminated efficiently and brightly with white light that is configured by fluorescence and excitation light.

When $S0/(\pi \times (R/2)^2)$ becomes smaller than a lower limit value, the total area of images $I_{12}$ of the LED chips 12 with respect to the area of the minimum circle including the LED chips 12 is excessively small. Therefore, even when illumination light has a sufficiently high numerical aperture, a luminance distribution in the light-emitting surface becomes non-uniform, and the numerical aperture in illumination fails to be homogenized, and an amount of illumination light becomes insufficient.

Conditional expression (6) indicates a relationship between the total area of images $I_{12}$ of a plurality of LED chips 12 projected onto the first plane and the area of the aperture of the aperture stop 70 in the open state. By satisfying conditional expression (6), bright illumination with a high illumination efficiency can be achieved in a state in which the aperture stop 70 is open.

When $(S0 \times MG)/(\pi \times (\varphi_{AS}/2)^2)$ exceeds an upper limit value, the magnification of image $I_{12}$ increases excessively. Therefore, it is difficult to project all of images $I_{12}$ of a plurality of LED chips 12 into the aperture 71, and illumination efficiency is reduced. When $(S0 \times MG)/(\pi \times (\varphi_{AS}/2)^2)$ becomes smaller than a lower limit value, the uniformity of a luminance distribution on the first plane is reduced, and the uniformity of illumination on a specimen surface is also reduced. When the magnification of image 112 is not excessively small but $(S0 \times MG)/(\pi \times (\varphi_{AS}/2)^2)$ is smaller than the lower limit value, the total area of the plurality of LED chips 12 is excessively small such that an amount of illumination light becomes insufficient.

Figure 9:
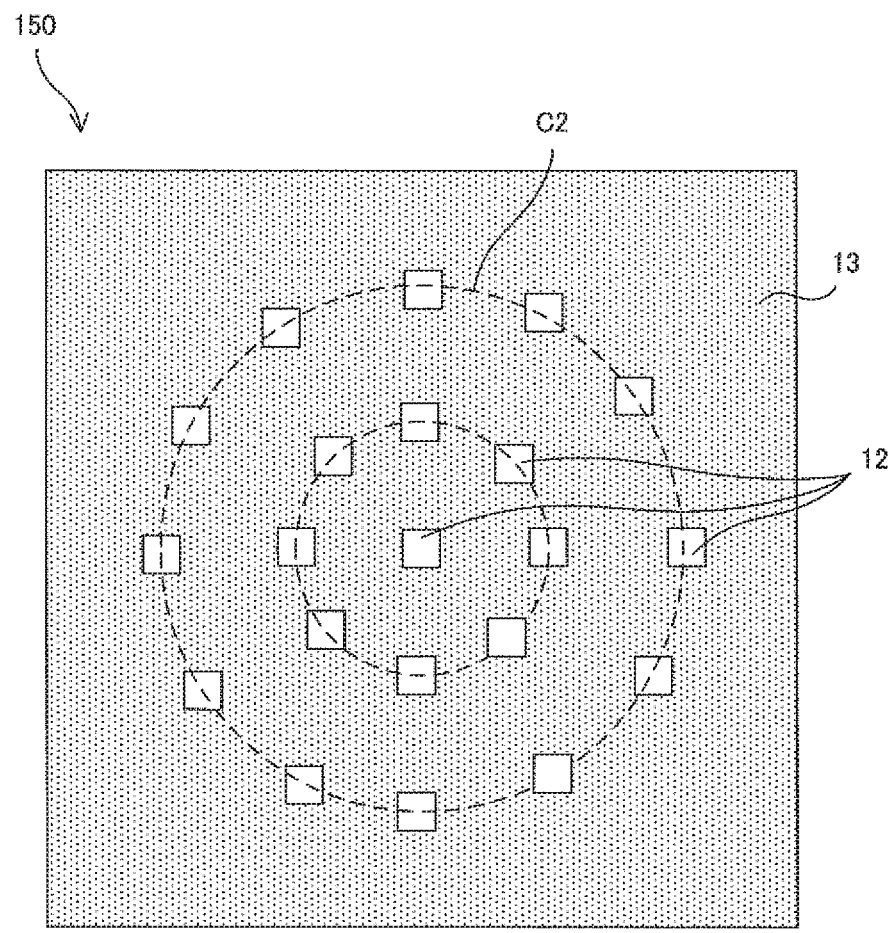
FIG. 9 illustrates another example of the arrangement of the LED chips 12 in the white LED light source 10.

An example in which a plurality of LED chips 12 are arranged in 6 rows and 6 columns on the board 11 has been described above, but the plurality of LED chips 12 may be arranged in M rows and N columns (M and N are respective integers of 4 or more) in order to assure a sufficient amount of light. The plurality of LED chips 12 do not always need to be arranged in a rectangular shape. Further, it is preferable that the plurality of LED chips 12 be arranged symmetrically with respect to the optical axis of the illumination optical system. Accordingly, the plurality of LED chips 12 may be arranged concentrically with respect to the optical axis of the illumination optical system, as illustrated in FIG. 9, for example.

Examples are described below in detail.

Example 1

A microscope illumination device and a microscope in this example are similar to the microscope illumination device 2 and the microscope 1 except that a white LED light source 160 is included instead of the white LED light source 10.

Figure 10:
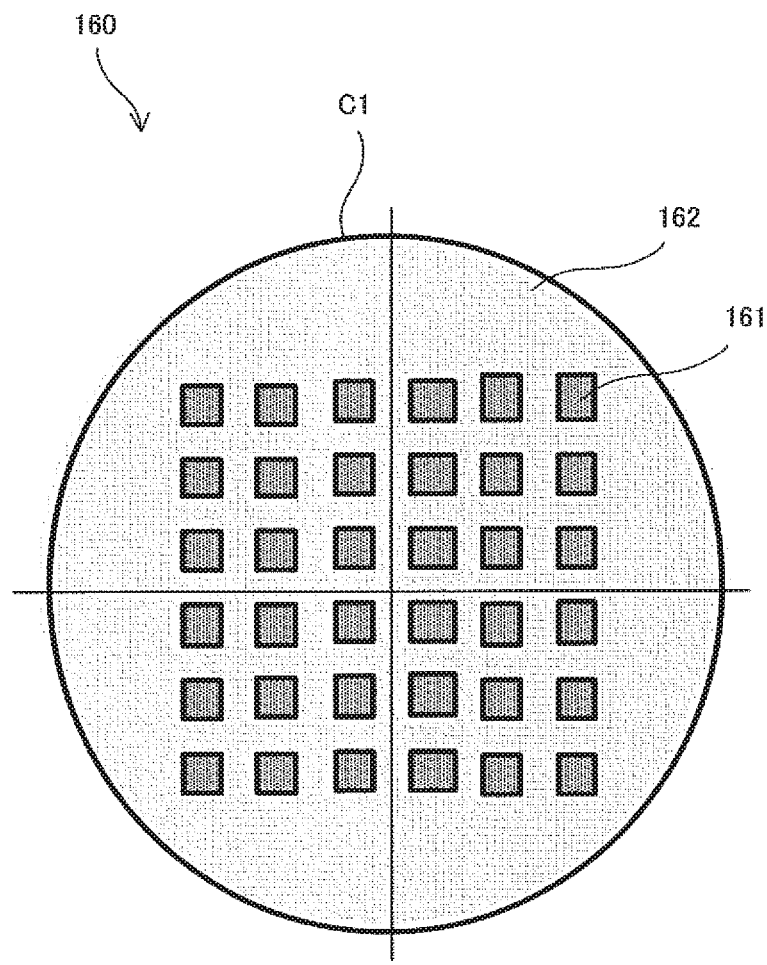
FIG. 10 illustrates an example of the arrangement of LED chips 161 in a white LED light source 160 in example 1.

FIG. 10 illustrates an example of the arrangement of LED chips 161 in the white LED light source 160. The white LED light source 160 is a white LED light source of a chip-on-board (COB) type. A basic configuration of the white LED light source 160 including a base, the plurality of LED chips 161, and a phosphor layer 162 is similar to the configuration of the white LED light source 10. The white LED light source 160 is also similar to the white LED light source 10 in that the plurality of LED chips 161 are arranged in 6 rows and 6 columns on the board with the optical axis of an illumination optical system as a center. The white LED light source 160 includes at least three types of phosphors such that the white LED light source 160 has color rendering equivalent to that of the halogen light source.

Various types of data of the white LED light source 160 are described below. W and H are the vertical and horizontal lengths of the LED chip 161. Q is the number of LED chips 161.

P=1 mm, $\varphi_{LED}$=9 mm, R=7.07 mm, H=0.5 mm, W=0.5 mm, S1=0.25 mm$^2$, Q=36, S0=9 mm$^2$ The other types of data are described below. FL is a focal length of the condenser lens 80, NA is the maximum numerical aperture of the condenser lens 80, and WD is a working distance of the condenser lens 80.

MG=3.6, $\varphi_{AS}$=27 mm, $\varphi_2$=1.5 mm, FL=15 mm, NA=0.9, WD=1 mm

In this example, all of conditional expression (1) to conditional expression (6) are satisfied, as described below. However, at least one of the centers of the LED chips 161 is not projected into the minimum diameter of an aperture stop.

$$\varphi_{LED} \times MG/\varphi_{AS}=1.200 \tag{1}$$

$$R/\varphi LED=0.786 \tag{2}$$

$$\varphi 2/(P \times MG)=0.417 \tag{3}$$

$$(S1 \times MG)/(\pi \times (\varphi_2/2)^2)=0.509 \tag{4}$$

$$S0/(\pi \times (R/2)^2)=0.229 \tag{5}$$

$$(S0 \times MG)/(\pi \times (\varphi_{AS}/2)^2)=0.057 \tag{6}$$

Example 2

A microscope illumination device and a microscope in this example are similar to the microscope illumination device 2 and the microscope 1 except that a white LED light source 170 is included instead of the white LED light source 10.

FIG. 11 illustrates an example of the arrangement of LED chips 161 in the white LED light source 170. The white LED light source 170 is similar to the white LED light source 160 except that the LED chips are arranged in 5 rows and 5 columns on a board with the optical axis of an illumination optical system as a center.

Various types of data of the white LED light source 170 are described below.

P=1 mm, $\varphi_{LED}$=9 mm, R=5.66 mm, H=0.5 mm, W=0.5 mm, S1=0.25 mm$^2$, Q=25, S0=6.25 mm$^2$ The other types of data are described below.

MG=3.6, $\varphi_{AS}$=27 mm, $\varphi_2$=1.5 mm, FL=15 mm, NA=0.9, WD=1 mm

In this example, all of conditional expression (1) to conditional expression (6) are satisfied, as described below. In this example, at least one of the centers of the LED chips 161 is projected into the minimum diameter of an aperture stop, as illustrated in FIG. 11.

$$\varphi_{LED} \times MG/\varphi_{AS}=1.200 \tag{1}$$

$$R/\varphi_{LED}=0.628 \tag{2}$$

$$\varphi_2/(P \times MG)=0.417 \tag{3}$$

$$(S1 \times MG)/(\pi \times (\varphi_2/2)^2)=0.509 \tag{4}$$

$$S0/(\pi \times (R/2)^2)=0.249 \tag{5}$$

$$(S0 \times MG)/(\pi \times (\varphi_{AS}/2)^2)=0.039 \tag{6}$$

Example 3

A microscope illumination device and a microscope in this example are similar to the microscope illumination device 2 and the microscope 1 except that a white LED light source 180 is included instead of the white LED light source 10 and that the projection magnification of an illumination optical system is different.

Figure 12:
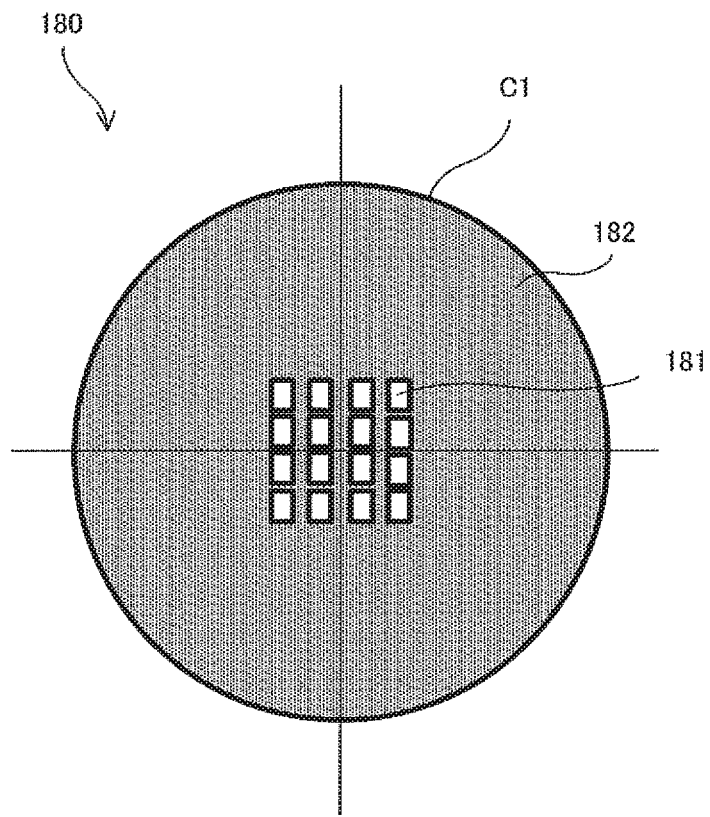
FIG. 12 illustrates an example of the arrangement of LED chips 181 in a white LED light source 180 in example 3.

FIG. 12 illustrates an example of the arrangement of LED chips 181 in the white LED light source 180. The white LED light source 180 is similar to the white LED light source 160 except that the LED chips are arranged in 4 rows and 4 columns on a board with the optical axis of the illumination optical system as a center, a space between the LED chips is different, the size of the LED chip is different, and the size of the light source (a phosphor layer 182) is different.

Various types of data of the white LED light source 180 are described below.

P=0.5 mm, $\varphi_{LED}$=7 mm, R=2.12 mm, H=0.4 mm, W=0.3 mm, S1=0.12 mm$^2$, Q=16, S0=1.92 mm$^2$ The other types of data are described below.

MG=4, $\varphi_{AS}$=27 mm, $\varphi_2$=1.5 mm, FL=15 mm, NA=0.9, WD=1 mm

In this example, conditional expression (1) to conditional expression (5) excluding conditional expression (6) are satisfied. However, at least one of the centers of the LED chips 161 is not projected into the minimum diameter of an aperture stop.

$$\varphi_{LED} \times MG/\varphi_{AS} = 1.037 \quad (1)$$

$$R/\varphi_{LED} = 0.303 \quad (2)$$

$$\varphi_2/(P \times MG) = 0.750 \quad (3)$$

$$(S1 \times MG)/(\pi \times (\varphi_2/2)^2) = 0.272 \quad (4)$$

$$S0/(\pi \times (R/2)^2) = 0.543 \quad (5)$$

$$(S0 \times MG)/(\pi \times (\varphi_{AS}/2)^2) = 0.013 \quad (6)$$

Example 4

A microscope illumination device and a microscope in this example are similar to the microscope illumination device 2 and the microscope 1 except that a white LED light source 190 is included instead of the white LED light source 10.

Figure 13:
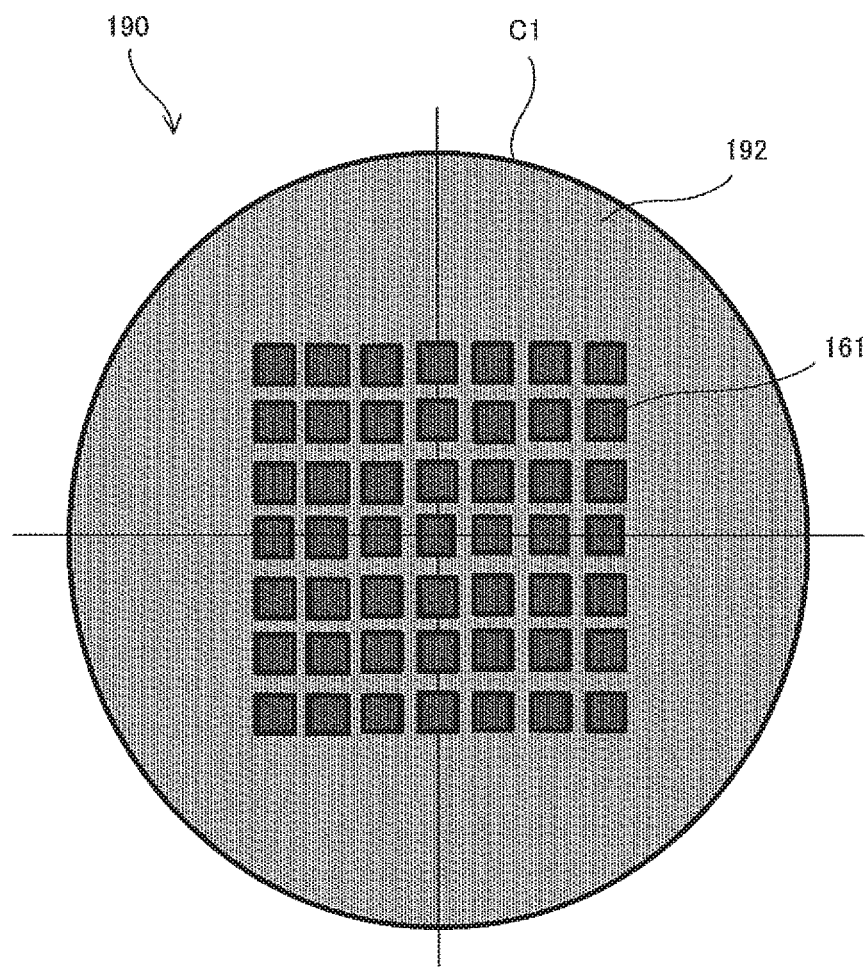
FIG. 13 illustrates an example of the arrangement of LED chips 161 in a white LED light source 190 in example 4.

FIG. 13 illustrates an example of the arrangement of LED chips 161 in the white LED light source 190. The white LED light source 190 is similar to the white LED light source 160 except that the LED chips are arranged in 7 rows and 7 columns on a board with the optical axis of an illumination optical system as a center, a space between the LED chips is different, and the size of the light source (a phosphor layer 192) is different.

Various types of the white LED light source 190 are described below.

P=0.7 mm, $\varphi_{LED}$=10 mm, R=5.94 mm, H=0.5 mm, W=0.5 mm, S1=0.25 mm$^2$, Q=49, S0=12.25 mm$^2$ The other types of data are described below.

MG=3.6, $\varphi_{AS}$=27 mm, $\varphi_2$=1.5 mm, FL=15 mm, NA=0.9, WD=1 mm

In this example, all of conditional expression (1) to conditional expression (6) are satisfied, as described below. At least one of the centers of the LED chips 161 is projected into the minimum diameter of an aperture stop.

$$\varphi_{LED} \times MG/\varphi_{AS} = 1.333 \quad (1)$$

$$R/\varphi_{LED} = 0.594 \quad (2)$$

$$\varphi_2/(P \times MG) = 0.595 \quad (3)$$

$$(S1 \times MG)/(\pi \times (\varphi_2/2)^2) = 0.509 \quad (4)$$

$$S0/(\pi \times (R/2)^2) = 0.442 \quad (5)$$

$$(S0 \times MG)/(\pi \times (\varphi_{AS}/2)^2) = 0.077 \quad (6)$$

Example 5

A microscope illumination device and a microscope in this example are similar to the microscope illumination device 2 and the microscope 1 except that a white LED light source 200 is included instead of the white LED light source 10 and the projection magnification of an illumination optical system is different.

Figure 14:
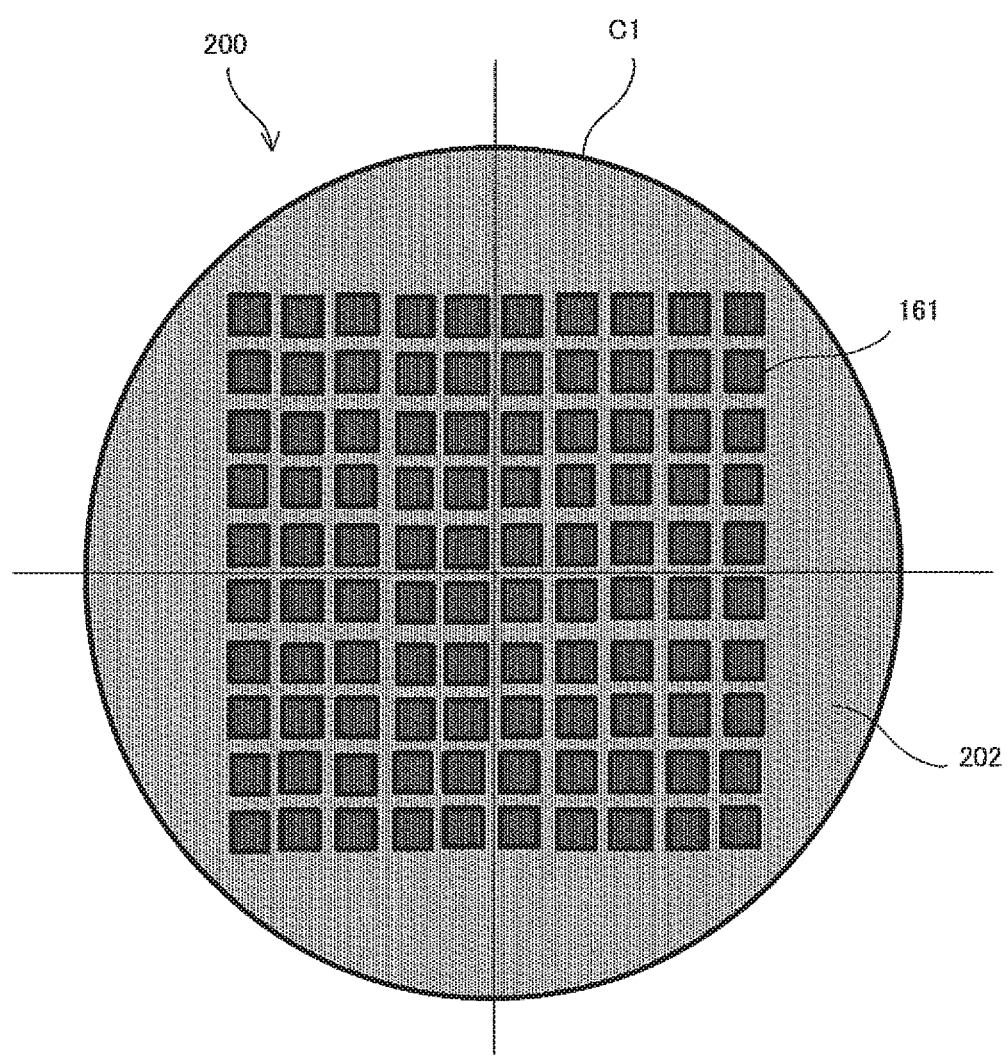
FIG. 14 illustrates an example of the arrangement of LED chips 161 in a white LED light source 200 in example 5.

FIG. 14 illustrates an example of the arrangement of LED chips 161 in the white LED light source 200. The white LED light source 200 is similar to the white LED light source 160 except that the LED chips are arranged in 10 rows and 10 columns on a board with the optical axis of the illumination optical system as a center, a space between the LED chips is different, and the size of the light source (a phosphor layer 202) is different.

Various types of data of the white LED light source 200 are described below.

P=0.7 mm, $\varphi_{LED}$=11 mm, R=8.91 mm, H=0.5 mm, W=0.5 mm, S1=0.25 mm$^2$, Q=100, S0=25 mm$^2$ The other types of data are described below.

MG=3, $\varphi_{AS}$=27 mm, $\varphi_2$=1.5 mm, FL=15 mm, NA=0.9, WD=1 mm

In this example, all of conditional expression (1) to conditional expression (6) are satisfied, as described below. However, at least one of the centers of the LED chips 161 is not projected into the minimum diameter of an aperture stop.

$$\varphi_{LED} \times MG/\varphi_{AS} = 1.222 \quad (1)$$

$$R/\varphi_{LED} = 0.810 \quad (2)$$

$$\varphi_2/(P \times MG) = 0.714 \quad (3)$$

$$(S1 \times MG)/(\pi \times (\varphi_2/2)^2) = 0.424 \quad (4)$$

$$S0/(\pi \times (R/2)^2) = 0.401 \quad (5)$$

$$(S0 \times MG)/(\pi \times (\varphi_{AS}/2)^2) = 0.131 \quad (6)$$

Example 6

A microscope illumination device and a microscope in this example are similar to the microscope illumination device 2 and the microscope 1 except that a white LED light source 210 is included instead of the white LED light source 10 and that the projection magnification of an illumination optical system is different.

Figure 15:
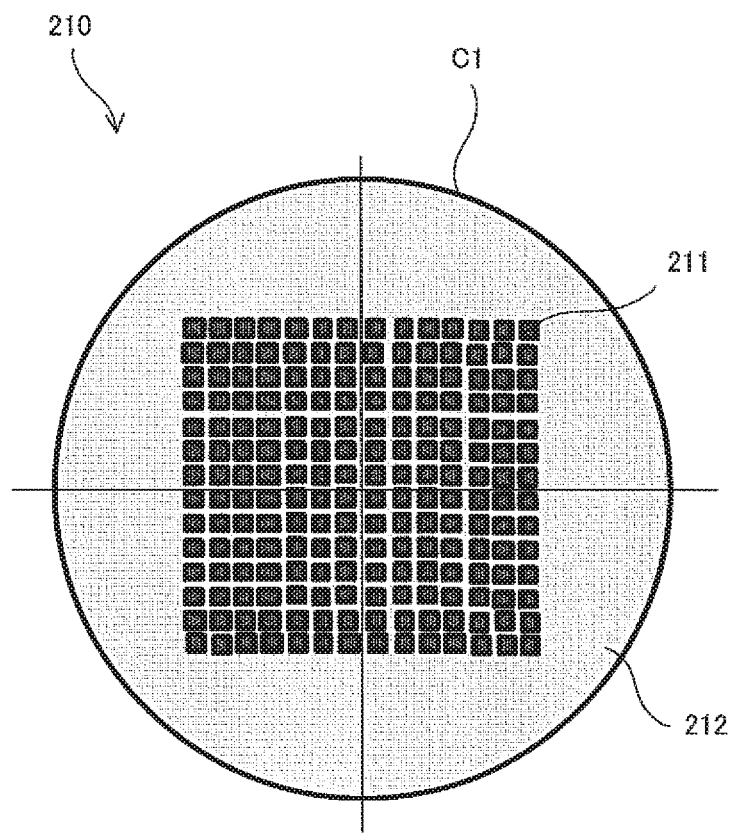
FIG. 15 illustrates an example of the arrangement of LED chips 211 in a white LED light source 210 in example 6.

FIG. 15 illustrates an example of the arrangement of LED chips 211 in the white LED light source 210. The white LED light source 210 is similar to the white LED light source 160 except that the LED chips are arranged in 14 rows and 14 columns on a board with the optical axis of the illumination optical system as a center, a space between the LED chips is different, the size of the LED chips is different, and the size of the light source (a phosphor layer 212) is different.

Various types of data of the white LED light source 210 are described above.

P=0.3 mm, $\varphi_{LED}$=8 mm, R=5.51 mm, H=0.2 mm, W=0.2 mm, S1=0.04 mm$^2$, Q=196, S0=7.84 mm$^2$ The other types of data are described below MG=3, $\varphi_{AS}$=27 mm, $\varphi_2$=1.5 mm, FL=15 mm, NA=0.9, WD=1 mm In this example, conditional expressions (1) to (3) and conditional expressions (5) and (6) excluding conditional expression (4) are satisfied. At least one of the centers of the LED chips 211 is projected into the minimum diameter of an aperture stop.

$$\varphi_{LED} \times MG/\varphi_{AS}=0.889 \quad (1)$$

$$R/\varphi_{LED}=0.689 \quad (2)$$

$$\varphi_2/(P \times MG)=1.667 \quad (3)$$

$$(S1 \times MG)/(\pi \times (\varphi_2/2)^2)=0.068 \quad (4)$$

$$S0/(\pi \times (R/2)^2)=0.328 \quad (5)$$

$$(S0 \times MG)/(\pi \times (\varphi_{AS}/2)^2)=0.041 \quad (6)$$

Example 7

A microscope illumination device and a microscope in this example are similar to the microscope illumination device 2 and the microscope 1 except that a white LED light source 220 is included instead of the white LED light source 10 and the projection magnification of an illumination optical system is different.

Figure 16:
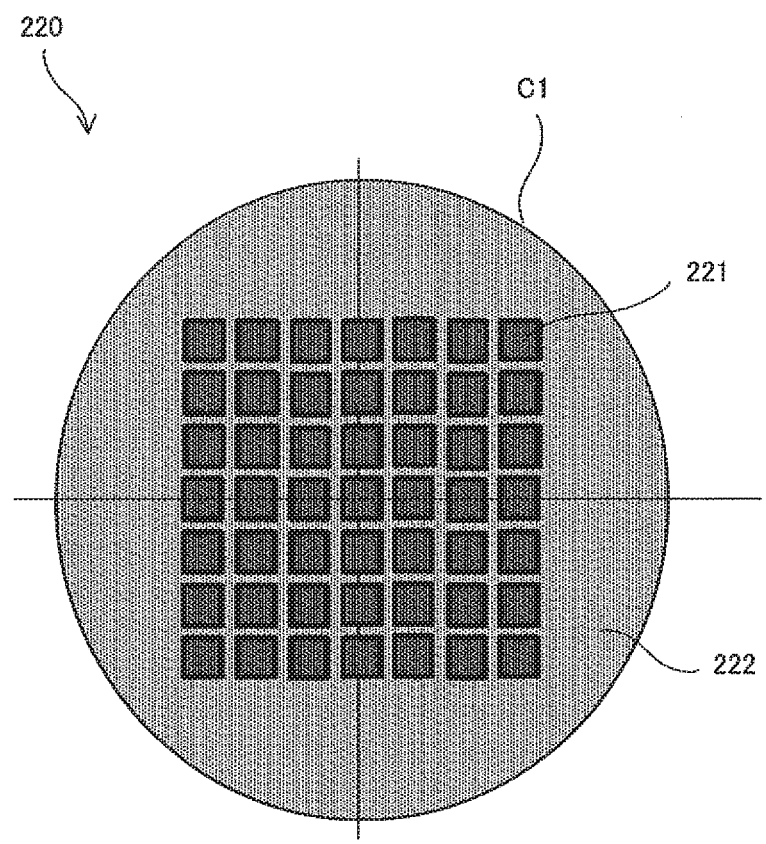
FIG. 16 illustrates an example of the arrangement of LED chips 221 in a white LED light source 220 in example 7.

FIG. 16 illustrates an example of the arrangement of LED chips 221 in the white LED light source 220. The white LED light source 220 is similar to the white LED light source 160 except that the LED chips are arranged in 7 rows and 7 columns on a board with the optical axis of the illumination optical system as a center, the size of the LED chip is different, and the size of the light source (a phosphor layer 222) is different.

Various types of data of the white LED light source 220 are described below.

P=1 mm, $\varphi_{LED}$=12 mm, R=8.48 mm, H=0.75 mm, W=0.75 mm, S1=0.5625 mm², Q=49, S0=27.5625 mm²

The other types of data are described below.

MG=3, $\varphi_{AS}$=27 mm, $\varphi_2$=1.5 mm, FL=15 mm, NA=0.9, WD=1 mm

In this example, all of conditional expression (1) to conditional expression (6) are satisfied, as described below. At least one of the centers of the LED chips 211 is projected into the minimum diameter of an aperture stop.

$$\varphi_{LED} \times MG/\varphi_{AS}=1.333 \quad (1)$$

$$R/\varphi_{LED}=0.707 \quad (2)$$

$$\varphi_2/(P \times MG)=0.500 \quad (3)$$

$$(S1 \times MG)/(\pi \times (\varphi_2/2)^2)=0.955 \quad (4)$$

$$S0/(\pi \times (R/2)^2)=0.488 \quad (5)$$

$$(S0 \times MG)/(\pi \times (\varphi_{AS}/2)^2)=0.144 \quad (6)$$

Example 8

A microscope illumination device and a microscope in this example are similar to the microscope illumination device 2 and the microscope 1 except that a white LED light source 230 is included instead of the white LED light source 10 and the projection magnification of an illumination optical system is different.

Figure 17:
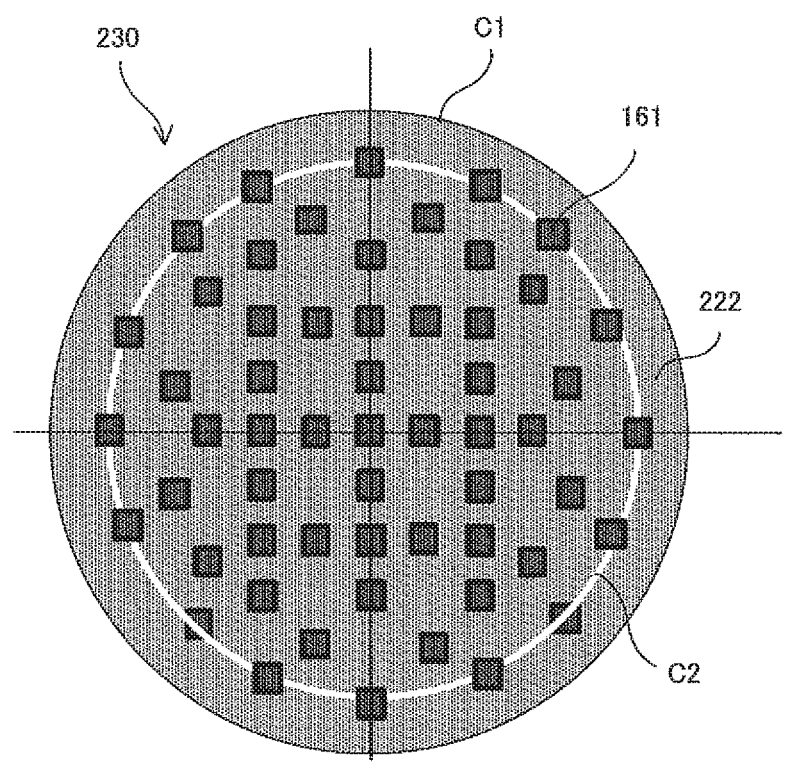
FIG. 17 illustrates an example of the arrangement of LED chips 161 in a white LED light source 230 in example 8.

FIG. 17 illustrates an example of the arrangement of LED chips 161 in the white LED light source 230. The white LED light source 230 is similar to the white LED light source 160 except that the LED chips are arranged at random on a board with the optical axis of the illumination optical system as a center and the size of the light source (a phosphor layer 222) is different.

Various types of data of the white LED light source 230 are described below.

P=1 mm, $\varphi_{LED}$=12 mm, R=10 mm, H=0.5 mm, W=0.5 mm, S1=0.25 mm², Q=57, S0=14.25 mm²

The other types of data are described below.

MG=3, $\varphi_{AS}$=27 mm, $\varphi_2$=1.5 mm, FL=15 mm, NA=0.9, WD=1 mm

In this example, all of conditional expression (1) to conditional expression (6) are satisfied, as described below. At least one of the centers of the LED chips 161 is projected into the minimum diameter of an aperture stop.

$$\varphi_{LED} \times MG/\varphi_{AS}=1.333 \quad (1)$$

$$R/\varphi_{LED}=0.833 \quad (2)$$

$$\varphi_2/(P \times MG)=0.500 \quad (3)$$

$$(S1 \times MG)/(\pi \times (\varphi_2/2)^2)=0.424 \quad (4)$$

$$S0/(\pi \times (R/2)^2)=0.181 \quad (5)$$

$$(S0 \times MG)/(\pi \times (\varphi_{AS}/2)^2)=0.075 \quad (6)$$

Example 9

A microscope illumination device and a microscope in this example are similar to the microscope illumination device 2 and the microscope 1 except that a white LED light source 240 is included instead of the white LED light source 10 and that the projection magnification of an illumination optical system is different.

Figure 18:
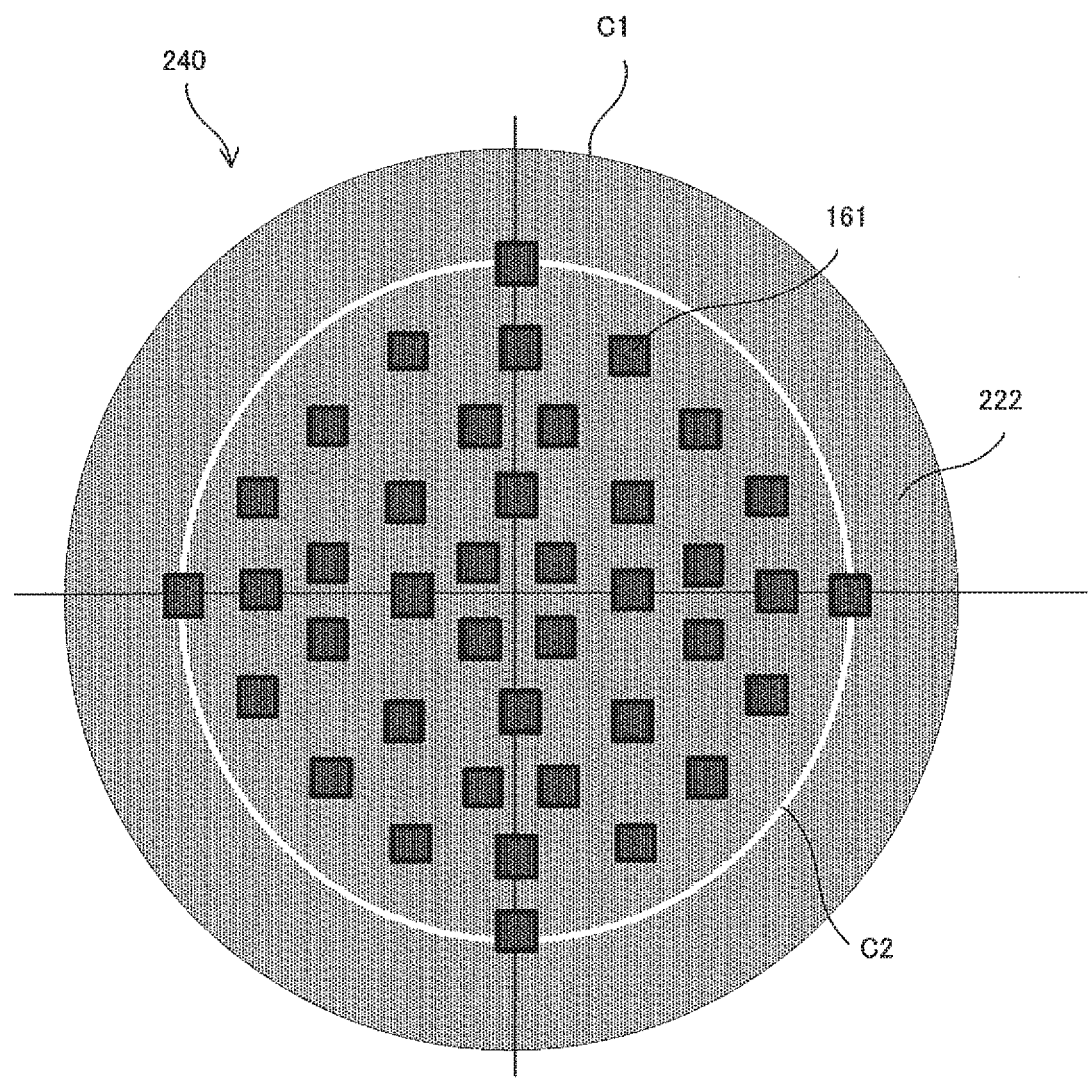
FIG. 18 illustrates an example of the arrangement of LED chips 161 in a white LED light source 240 in example 9.

FIG. 18 illustrates an example of the arrangement of LED chips 161 in the white LED light source 240. The white LED light source 240 is similar to the white LED light source 160 except that the LED chips are arranged at random on a board with the optical axis of the illumination optical system as a center and the size of the light source (a phosphor layer 222) is different.

Various types of data of the white LED light source 240 are described below.

P=1 mm, $\varphi_{LED}$=12 mm, R=9 mm, H=0.5 mm, W=0.5 mm, S1=0.25 mm², Q=40, S0=10 mm²

The other types of data are described below.

MG=3, $\varphi_{AS}$=27 mm, $\varphi_2$=1.5 mm, FL=15 mm, NA=0.9, WD=1 mm

In this example, all of conditional expression (1) to conditional expression (6) are satisfied, as described below. However, at least of the centers of the LED chips 161 is not projected into the minimum diameter of an aperture stop.

$$\varphi_{LED} \times MG/\varphi_{AS}=1.333 \quad (1)$$

$$R/\varphi_{LED}=0.750 \quad (2)$$

$$\varphi_2/(P \times MG)=0.500 \quad (3)$$

$$(S1 \times MG)/(\pi \times (\varphi_2/2)^2)=0.424 \quad (4)$$

$$S0/(\pi \times (R/2)^2)=0.157 \quad (5)$$

$$(S0 \times MG)/(\pi \times (\varphi_{AS}/2)^2)=0.052 \quad (6)$$

Example 10

A microscope illumination device and a microscope in this example are similar to the microscope illumination device 2 and the microscope 1 except that a white LED light source 250 is included instead of the white LED light source 10.

Figure 19:
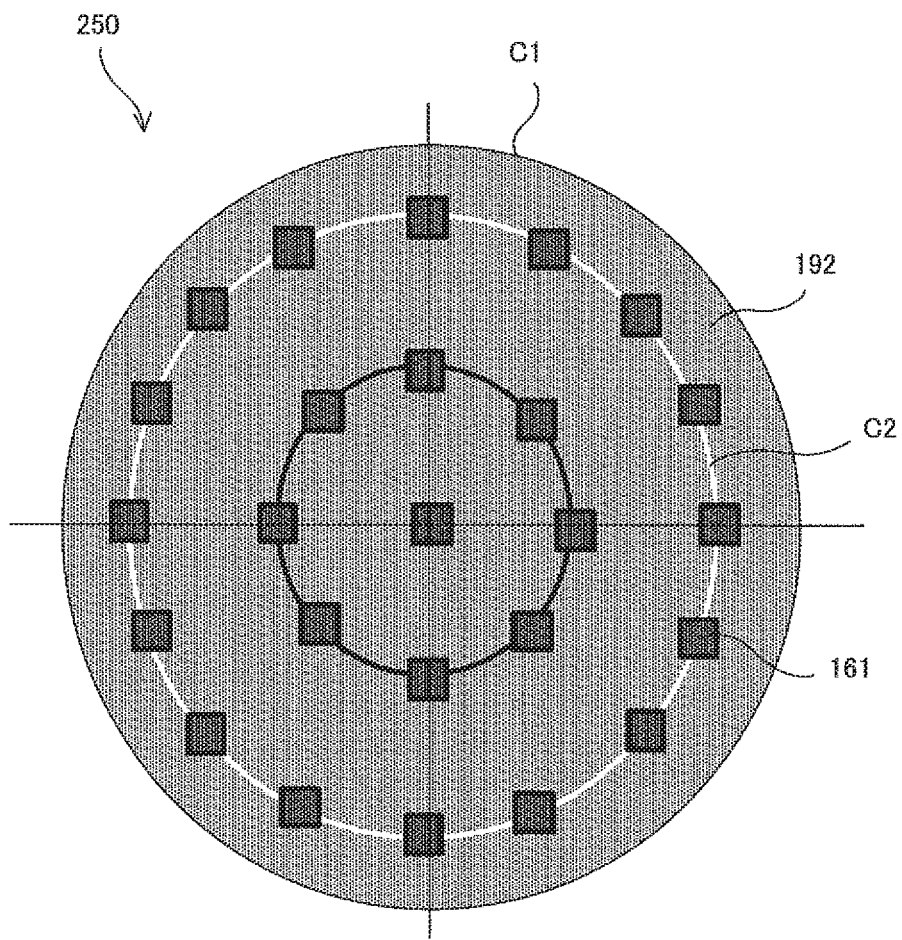
FIG. 19 illustrates an example of the arrangement of LED chips 161 in a white LED light source 250 in example 10.

FIG. 19 illustrates an example of the arrangement of LED chips 161 in the white LED light source 250. The white LED light source 250 is similar to the white LED light source 160 except that the LED chips are arranged concentrically on a board with the optical axis of an illumination optical system as a center, a space between the LED chips is different, and the size of the light source (a phosphor layer 192) is different.

Various types of data of the white LED light source 250 are described below.

P=1.57 mm, $\varphi_{LED}$=10 mm, R=8 mm, H=0.5 mm, W=0.5 mm, S1=0.25 mm$^2$, Q=25, S0=6.25 mm$^2$ The other types of data are described below.

MG=3.6, $\varphi_{AS}$=27 mm, $\varphi_2$=1.5 mm, FL=15 mm, NA=0.9, WD=1 mm

In this example, conditional expression (1) to conditional expression (6) are satisfied, as described below. At least of the centers of the LED chips 161 is projected into the minimum diameter of an aperture stop.

$$\varphi_{LED} \times MG/\varphi_{AS} = 1.333 \quad (1)$$

$$R/\varphi_{LED} = 0.800 \quad (2)$$

$$\varphi_2/(P \times MG) = 0.265 \quad (3)$$

$$(S1 \times MG)/(\pi \times (\varphi_2/2)^2) = 0.509 \quad (4)$$

$$S0/(\pi \times (R/2)^2) = 0.124 \quad (5)$$

$$(S0 \times MG)/(\pi \times (\varphi_{AS}/2)^2) = 0.039 \quad (6)$$

Example 11

A microscope illumination device and a microscope in this example are similar to the microscope illumination device 2 and the microscope 1 except that a white LED light source 260 is included instead of the white LED light source 10.

Figure 20:
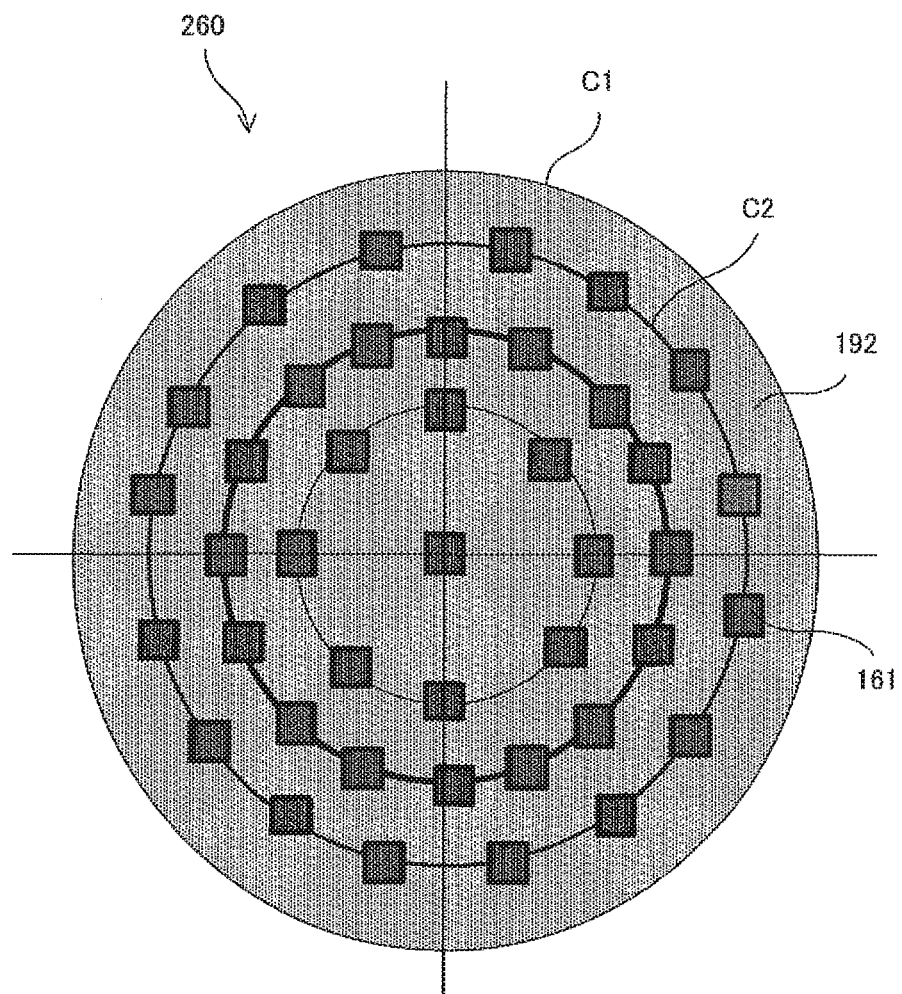
FIG. 20 illustrates an example of the arrangement of LED chips 161 in a white LED light source 260 in example 11.

FIG. 20 illustrates an example of the arrangement of LED chips 161 in the white LED light source 260. The white LED light source 260 is similar to the white LED light source 160 except that the LED chips are arranged concentrically on a board with the optical axis of an illumination optical system as a center, a space between the LED chips is different, and the size of the light source (a phosphor layer 192) is different.

Various types of data of the white LED light source 260 are described below.

P=1.18 mm, $\varphi_{LED}$=10 mm, R=8 mm, H=0.5 mm, W=0.5 mm, S1=0.25 mm$^2$, Q=41, S0=10.25 mm$^2$ The other types of data are described below.

MG=3.6, $\varphi_{AS}$=27 mm, $\varphi_2$=1.5 mm, FL=15 mm, NA=0.9, WD=1 mm

In this example, conditional expression (1) to conditional expression (6) are satisfied, as described below. The center of the LED chips 161 is projected into the minimum diameter of an aperture stop.

$$\varphi_{LED} \times MG/\varphi_{AS} = 1.333 \quad (1)$$

$$R/\varphi_{LED} = 0.800 \quad (2)$$

$$\varphi_2/(P \times MG) = 0.353 \quad (3)$$

$$(S1 \times MG)/(\pi \times (\varphi_2/2)^2) = 0.509 \quad (4)$$

$$S0/(\pi \times (R/2)^2) = 0.204 \quad (5)$$

$$(S0 \times MG)/(\pi \times (\varphi_{AS}/2)^2) = 0.064 \quad (6)$$

The embodiment and the examples described above give specific examples of the present invention in order to make the invention easily understandable, and the embodiments and the examples of the present invention are not limited to the embodiment and the examples described above. Various modifications or variations can be made to the microscope illumination device and the microscope without departing from the description of the claims.

What is claimed is:

1. A microscope illumination device comprising:
a white LED light source that includes a board, a plurality of LED chips that are arranged on the board and each of which is configured to emit excitation light, and a phosphor layer that is provided so as to cover the plurality of LED chips and that includes at least three types of phosphors; and
an illumination optical system that includes an aperture stop on a plane on which light from the white LED light source is condensed,
wherein:
the plurality of LED chips are arranged so as to be projected into an aperture of the aperture stop when the aperture stop is in a fully open state; and
when $\varphi_{LED}$ is a diameter of a circle inscribed in the phosphor layer, MG is a magnification of an image of the white LED light source that is projected onto the plane on which the aperture stop is located, $\varphi_{AS}$ is an aperture diameter of the aperture stop in the fully open state, and R is a diameter of a minimum circle including the plurality of LED chips, conditional expressions (1) and (2) below are satisfied:

$$0.7 \leq (\varphi_{LED} \times MG/\varphi_{AS}) \leq 1.5 \quad (1); \text{ and}$$

$$0.3 \leq R/\varphi_{LED} \quad (2).$$

2. The microscope illumination device according to claim 1, wherein:
each of the plurality of LED chips is configured to emit the excitation light in a near-ultraviolet wavelength region; and
each of the at least three types of phosphors is a phosphor that generates fluorescence in a visible wavelength region.

3. The microscope illumination device according to claim 2, wherein:
when $\varphi_2$ is an aperture diameter of the aperture stop in a state in which an aperture size of the aperture stop is minimized, and P is a minimum space between centers of the plurality of LED chips, conditional expression (3) below is satisfied:

$$0.25 \leq \varphi_2/(P \times MG) \leq 2 \quad (3); \text{ and}$$

the center of at least one LED chip of the plurality of LED chips is projected into the aperture of the aperture stop in the state in which the aperture size of the aperture stop is minimized.

4. The microscope illumination device according to claim 3, wherein the plurality of LED chips are arranged in M rows and N columns (M and N are respective integers of 4 or more) on the board.

5. The microscope illumination device according to claim 3, wherein the plurality of LED chips are arranged concentrically with an optical axis of the illumination optical system as a center on the board.

6. The microscope illumination device according to claim 2, wherein the plurality of LED chips are arranged in M rows and N columns (M and N are respective integers of 4 or more) on the board.

7. The microscope illumination device according to claim 2, wherein the plurality of LED chips are arranged concentrically with an optical axis of the illumination optical system as a center on the board.

8. The microscope illumination device according to claim 1, wherein:
when $\varphi_2$ is an aperture diameter of the aperture stop in a state in which an aperture size of the aperture stop is minimized, and P is a minimum space between centers of the plurality of LED chips, conditional expression (3) below is satisfied:

$$0.25 \leq \varphi_2/(P \times MG) \leq 2 \qquad (3); \text{ and}$$

the center of at least one LED chip of the plurality of LED chips is projected into the aperture of the aperture stop in the state in which the aperture size of the aperture stop is minimized.

9. The microscope illumination device according to claim 8, wherein the plurality of LED chips are arranged in M rows and N columns (M and N are respective integers of 4 or more) on the board.

10. The microscope illumination device according to claim 8, wherein the plurality of LED chips are arranged concentrically with an optical axis of the illumination optical system as a center on the board.

11. The microscope illumination device according to claim 1, wherein the plurality of LED chips are arranged in M rows and N columns (M and N are respective integers of 4 or more) on the board.

12. The microscope illumination device according to claim 1, wherein the plurality of LED chips are arranged concentrically with an optical axis of the illumination optical system as a center on the board.

13. A microscope comprising:
the microscope illumination device according to claim 1.

14. A microscope illumination device comprising:
a white LED light source that includes a board, a plurality of LED chips that are arranged on the board and that each emit excitation light, and a phosphor layer that is provided so as to cover the plurality of LED chips and that includes at least three types of phosphors; and
an illumination optical system that includes an aperture stop on a plane on which light from the white LED light source is condensed,
wherein:
the plurality of LED chips are arranged so as to be projected into an aperture of the aperture stop when the aperture stop is in a fully open state; and
when MG is a magnification of an image of the white LED light source projected onto the plane on which the aperture stop is located, $\varphi_{AS}$ is an aperture diameter of the aperture stop in the fully open state, $\varphi_2$ is an aperture diameter of the aperture stop in a state in which an aperture size of the aperture stop is minimized, R is a diameter of a minimum circle including the plurality of LED chips, S1 is an area of one LED chip of the plurality of LED chips, and S0 is a sum of the areas of the plurality of LED chips, conditional expressions (4), (5), and (6) below are satisfied:

$$0.25 \leq (S1 \times MG)/(\pi \times (\varphi_2/2)^2) \leq 1 \qquad (4);$$

$$0.1 \leq S0/(\pi \times (R/2)^2) \qquad (5); \text{ and}$$

$$0.03 \leq (S0 \times MG)/(\pi \times (\varphi_{AS}/2)^2) \leq 0.15 \qquad (6).$$

* * * * *